US011689631B2

(12) United States Patent
Haltore et al.

(10) Patent No.: US 11,689,631 B2
(45) Date of Patent: *Jun. 27, 2023

(54) TRANSPARENT NETWORK SERVICE MIGRATION ACROSS SERVICE DEVICES

(71) Applicant: VMware, Inc., Palo Alto, CA (US)

(72) Inventors: Kiron Haltore, San Jose, CA (US); Murali Basavaiah, Sunnyvale, CA (US); Ranganathan Rajagopalan, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/120,760

(22) Filed: Dec. 14, 2020

(65) Prior Publication Data

US 2021/0099533 A1 Apr. 1, 2021

Related U.S. Application Data

(63) Continuation of application No. 16/043,926, filed on Jul. 24, 2018, now Pat. No. 10,868,875, which is a (Continued)

(51) Int. Cl.
H04L 67/148 (2022.01)
H04L 67/51 (2022.01)
(Continued)

(52) U.S. Cl.
CPC ............ *H04L 67/51* (2022.05); *G06F 9/4856* (2013.01); *H04L 61/103* (2013.01); (Continued)

(58) Field of Classification Search
CPC ... H04L 67/16; H04L 61/103; H04L 61/1511; H04L 61/6022; H04L 67/148; G06F 9/4856
(Continued)

(56) References Cited

U.S. PATENT DOCUMENTS 6,750,897 B1 6/2004 Moshrefi et al.
7,817,549 B1 10/2010 Kasralikar et al.
(Continued)

OTHER PUBLICATIONS

Al-Fares, Mohammed, et al., "Hedera: Dynamic Flow Scheduling for Data Center Networks," 7th USENIX Symposium on Networked Systems Design and Implementation (NSDI 2010), Apr. 28-30, 2010, 15 pages, San Jose, CA, USA.
(Continued)

Primary Examiner — Sibte H Bukhari
(74) Attorney, Agent, or Firm — Adeli LLP

(57) ABSTRACT

Migrating a network service that is currently being performed by a first device to be performed by a second device includes: instructing the second device to notify an upstream network device to forward traffic that is to be serviced by the network service to the second device instead of to the first device, the network service being associated with an Internet Protocol (IP) address; and instructing the first device to migrate the network service to the second device, wherein the migration includes moving or copying state information associated with an existing flow currently serviced by the first device to the second device; the existing flow being an existing flow between a client application and a network application.

15 Claims, 11 Drawing Sheets

Related U.S. Application Data continuation of application No. 14/195,415, filed on Mar. 3, 2014, now Pat. No. 10,110,684.

(60) Provisional application No. 61/866,476, filed on Aug. 15, 2013.

(51) Int. Cl.
| | | |
|---|---|---|
| *G06F 9/48* | (2006.01) | |
| *H04L 61/103* | (2022.01) | |
| *H04L 61/4511* | (2022.01) | |
| *H04L 101/622* | (2022.01) | |

(52) U.S. Cl.
CPC ........ *H04L 61/4511* (2022.05); *H04L 67/148* (2013.01); *H04L 2101/622* (2022.05)

(58) Field of Classification Search
USPC ........................................................ 709/223
See application file for complete search history.

(56) References Cited

U.S. PATENT DOCUMENTS

| | | | |
|---|---|---|---|
| 7,924,739 B2 | 4/2011 | Sen et al. | |
| 7,940,766 B2 | 5/2011 | Olakangil et al. | |
| 7,983,270 B2 | 7/2011 | Wong | |
| 8,018,852 B2 | 9/2011 | Olakangil et al. | |
| 8,103,750 B2 | 1/2012 | O'Neal et al. | |
| 8,462,774 B2 | 6/2013 | Page et al. | |
| 8,499,093 B2 | 7/2013 | Grosser et al. | |
| 8,611,251 B2 | 12/2013 | Subramanian et al. | |
| 8,630,297 B2 | 1/2014 | Subramanian et al. | |
| 8,671,407 B2 | 3/2014 | Ballani et al. | |
| 8,755,283 B2 | 6/2014 | Patel et al. | |
| 8,812,727 B1 | 8/2014 | Sorenson et al. | |
| 8,964,571 B2 | 2/2015 | Chaudhry et al. | |
| 8,972,602 B2 | 3/2015 | Mithyantha | |
| 8,989,189 B2 | 3/2015 | Zhang et al. | |
| 9,083,642 B2 | 7/2015 | Janardhanan | |
| 9,419,889 B2 | 8/2016 | Xiao et al. | |
| 9,509,614 B2 | 11/2016 | Bosch et al. | |
| 9,519,500 B2 | 12/2016 | Ballani et al. | |
| 9,584,421 B2 | 2/2017 | Rai et al. | |
| 9,843,520 B1 | 12/2017 | Haltore et al. | |
| 10,091,093 B2 | 10/2018 | Luo et al. | |
| 10,110,684 B1 | 10/2018 | Haltore et al. | |
| 10,225,194 B2 | 3/2019 | Haltore et al. | |
| 10,868,875 B2 | 12/2020 | Haltore et al. | |
| 2001/0023453 A1 | 9/2001 | Sundqvist | |
| 2003/0069993 A1 | 4/2003 | Na et al. | |
| 2005/0239444 A1 | 10/2005 | Shieh | |
| 2006/0209818 A1 | 9/2006 | Purser | |
| 2008/0080517 A1 | 4/2008 | Roy et al. | |
| 2008/0101233 A1 | 5/2008 | Shi et al. | |
| 2008/0137660 A1 | 6/2008 | Olakangil et al. | |
| 2009/0010257 A1 | 1/2009 | Chaudhry et al. | |
| 2009/0276771 A1* | 11/2009 | Nickolov ............ | H04L 67/1014 |
| | | | 717/177 |
| 2010/0002606 A1 | 1/2010 | Preis et al. | |
| 2010/0036903 A1 | 2/2010 | Ahmad et al. | |
| 2010/0046515 A1 | 2/2010 | Wong | |
| 2010/0157840 A1 | 6/2010 | Sen et al. | |
| 2010/0162036 A1 | 6/2010 | Linden et al. | |
| 2010/0268764 A1 | 10/2010 | Wee et al. | |
| 2010/0287262 A1 | 11/2010 | Elzur | |
| 2011/0185082 A1 | 7/2011 | Thompson | |
| 2011/0211579 A1 | 9/2011 | Cao et al. | |
| 2011/0261812 A1 | 10/2011 | Kini et al. | |
| 2011/0283013 A1 | 11/2011 | Grosser et al. | |
| 2012/0033672 A1 | 2/2012 | Page et al. | |
| 2012/0066371 A1 | 3/2012 | Patel et al. | |
| 2012/0106347 A1 | 5/2012 | Allan et al. | |
| 2012/0155266 A1 | 6/2012 | Patel et al. | |
| 2012/0155468 A1 | 6/2012 | Greenberg et al. | |
| 2012/0201252 A1 | 8/2012 | Subramanian et al. | |
| 2013/0014101 A1 | 1/2013 | Ballani et al. | |
| 2013/0044757 A1 | 2/2013 | Rai et al. | |
| 2013/0103827 A1 | 4/2013 | Dunlap et al. | |
| 2013/0155902 A1 | 6/2013 | Feng et al. | |
| 2013/0227165 A1 | 8/2013 | Liu | |
| 2013/0286846 A1 | 10/2013 | Atlas et al. | |
| 2013/0301640 A9 | 11/2013 | Subramanian et al. | |
| 2013/0308455 A1 | 11/2013 | Kapadia et al. | |
| 2013/0329730 A1 | 12/2013 | Zhang et al. | |
| 2013/0339544 A1 | 12/2013 | Mithyantha | |
| 2013/0343386 A1 | 12/2013 | Sankar et al. | |
| 2013/0346572 A1* | 12/2013 | Jain ................ | G06F 9/5088 |
| | | | 709/223 |
| 2014/0025770 A1 | 1/2014 | Warfield et al. | |
| 2014/0029618 A1 | 1/2014 | Janardhanan | |
| 2014/0089500 A1 | 3/2014 | Sankar et al. | |
| 2014/0126376 A1 | 5/2014 | Rai et al. | |
| 2014/0157274 A1 | 6/2014 | Ballani et al. | |
| 2014/0185446 A1 | 7/2014 | Patel et al. | |
| 2014/0310391 A1 | 10/2014 | Sorenson et al. | |
| 2014/0355563 A1 | 12/2014 | Sane et al. | |
| 2014/0369204 A1 | 12/2014 | Anand et al. | |
| 2014/0379938 A1 | 12/2014 | Bosch et al. | |
| 2015/0023352 A1 | 1/2015 | Yang et al. | |
| 2015/0078152 A1 | 3/2015 | Garg et al. | |
| 2015/0163144 A1 | 6/2015 | Koponen et al. | |
| 2015/0256448 A1 | 9/2015 | Xiao et al. | |
| 2015/0381484 A1 | 12/2015 | Hira et al. | |
| 2016/0065479 A1 | 3/2016 | Harper et al. | |
| 2016/0191457 A1 | 6/2016 | Torzillo et al. | |
| 2016/0301608 A1 | 10/2016 | Natarajan et al. | |
| 2016/0344633 A1 | 11/2016 | Jiao et al. | |
| 2017/0295100 A1 | 10/2017 | Hira et al. | |
| 2017/0353572 A1* | 12/2017 | Wang ................ | H04L 29/06 |
| 2018/0004693 A1 | 1/2018 | Macnamara et al. | |
| 2018/0006928 A1 | 1/2018 | Luo et al. | |
| 2018/0097735 A1 | 4/2018 | Haltore et al. | |
| 2018/0302770 A1 | 10/2018 | Bhaskaran et al. | |
| 2018/0332124 A1 | 11/2018 | Haltore et al. | |

OTHER PUBLICATIONS

Curtis, Andrew R., et al., "DevoFlow: Scaling Flow Management for High-Performance Networks," SIGCOMM '11, Aug. 15-19, 2011, 12 pages, ACM.

Mckeown, Nick, et al., "OpenFlow: Enabling Innovation in Campus Networks," ACM SIGCOMM Computer Communication Review, Apr. 2008, 6 pages, vol. 38, No. 2, ACM.

* cited by examiner

TRANSPARENT NETWORK SERVICE MIGRATION ACROSS SERVICE DEVICES

CROSS REFERENCE TO OTHER APPLICATIONS

This application is a continuation application of U.S. patent application Ser. No. 16/043,926, now published as U.S. Patent Publication 2018/0332124, entitled TRANSPARENT NETWORK SERVICE MIGRATION ACROSS SERVICE DEVICES filed Jul. 24, 2018. U.S. patent application Ser. No. 16/043,926 is a continuation of U.S. patent application Ser. No. 14/195,415, now issued as U.S. Pat. No. 10,110,684, entitled TRANSPARENT NETWORK SERVICE MIGRATION ACROSS SERVICE DEVICES filed Mar. 3, 2014, which claims priority to U.S. Provisional Patent Application No. 61/866,476, entitled TRANSPARENT NETWORK SERVICE MIGRATION ACROSS SERVICE DEVICES filed Aug. 15, 2013. U.S. Provisional Patent Application No. 61/866,476, U.S. patent application Ser. No. 14/195,415, now issued as U.S. Pat. No. 10,110,684, and U.S. patent application Ser. No. 16/043,926, now published as U.S. Patent Publication 2018/0332124, are incorporated herein by reference for all purposes.

BACKGROUND OF THE INVENTION

Many data centers (both enterprise data centers and service provider data centers) are adopting cloud-based infrastructures. In such data centers, a large number of computers connect through a network to provide distributed computing services. One of the primary requirements of a cloud-based computing platform (both public and private) is agility and flexibility to place and move any infrastructure element to anywhere else in the infrastructure.

In a data center environment, it is often necessary to migrate an application from one device to another or otherwise shut down one application and start a new instance. For example, it is sometimes difficult to know resource requirements (e.g., bandwidth, memory, etc.) of applications prior to deployment. A device on which multiple applications are installed may run out of capacity. At this point, the system and/or its administrator would need to migrate a certain application to a different device that has extra capacity. As another example, during operation, applications may need to be migrated among different devices so that resources are more evenly distributed to service the applications. As yet another example, whenever a new version of an application needs to be installed on the devices, the old version is shutdown. When an existing application migrates from one device to another or an old version is shut down, existing flows with clients are typically interrupted. To minimize the impact of the migration, the process should be transparent to the application and its clients. In other words, the application and the clients serviced by the application should be uninterrupted during the migration. Most data centers today are unable to support such uninterrupted migration.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Migration of a network service between devices is disclosed. A network service that is currently being performed on a first device is migrated so that it can be performed on a second device. In some embodiments, the second device is instructed to notify an upstream network device to forward traffic that is to be serviced by the network service to the second device instead of to the first device, the network service being associated with an Internet Protocol (IP) address. The first device is instructed to migrate an existing flow that is currently serviced by the first device to be serviced by the second device.

As used herein, a flow refers to traffic associated with a connection between two points on a network, such as data packets that are exchanged between two different applications operating on different devices. A flow can be bidirectional or unidirectional. Here, the existing flow that is migrated is an existing flow between a client and a network application.

Figure 1:
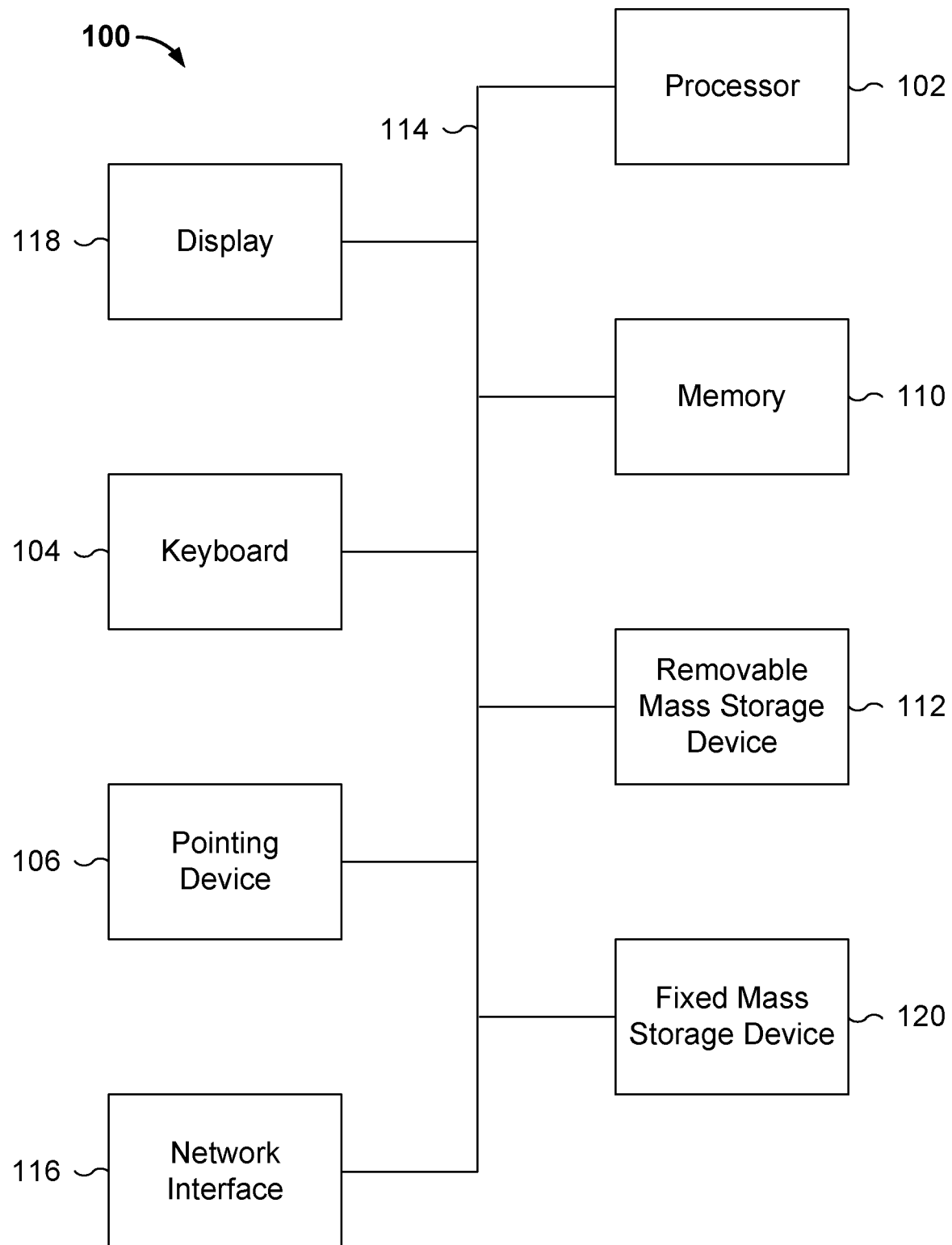
FIG. 1 is a block diagram illustrating an embodiment of a programmed computer system configured to perform one or more networking services and allow migration of the one or more networking services in accordance with some embodiments.

FIG. 1 is a block diagram illustrating an embodiment of a programmed computer system configured to perform one or more networking services and allow migration of the one or more networking services in accordance with some embodiments. As will be apparent, other computer system architectures and configurations can be used to perform network services and allow migration of the networking services. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to perform the processes described below with respect to FIGS. 4-6.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or unidirectional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, a pointing device 106, as well as an auxiliary input/output device interface, a sound card, speakers, and other subsystems as needed. One or more subsystems of each type can be included, and some subsystems can be omitted.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
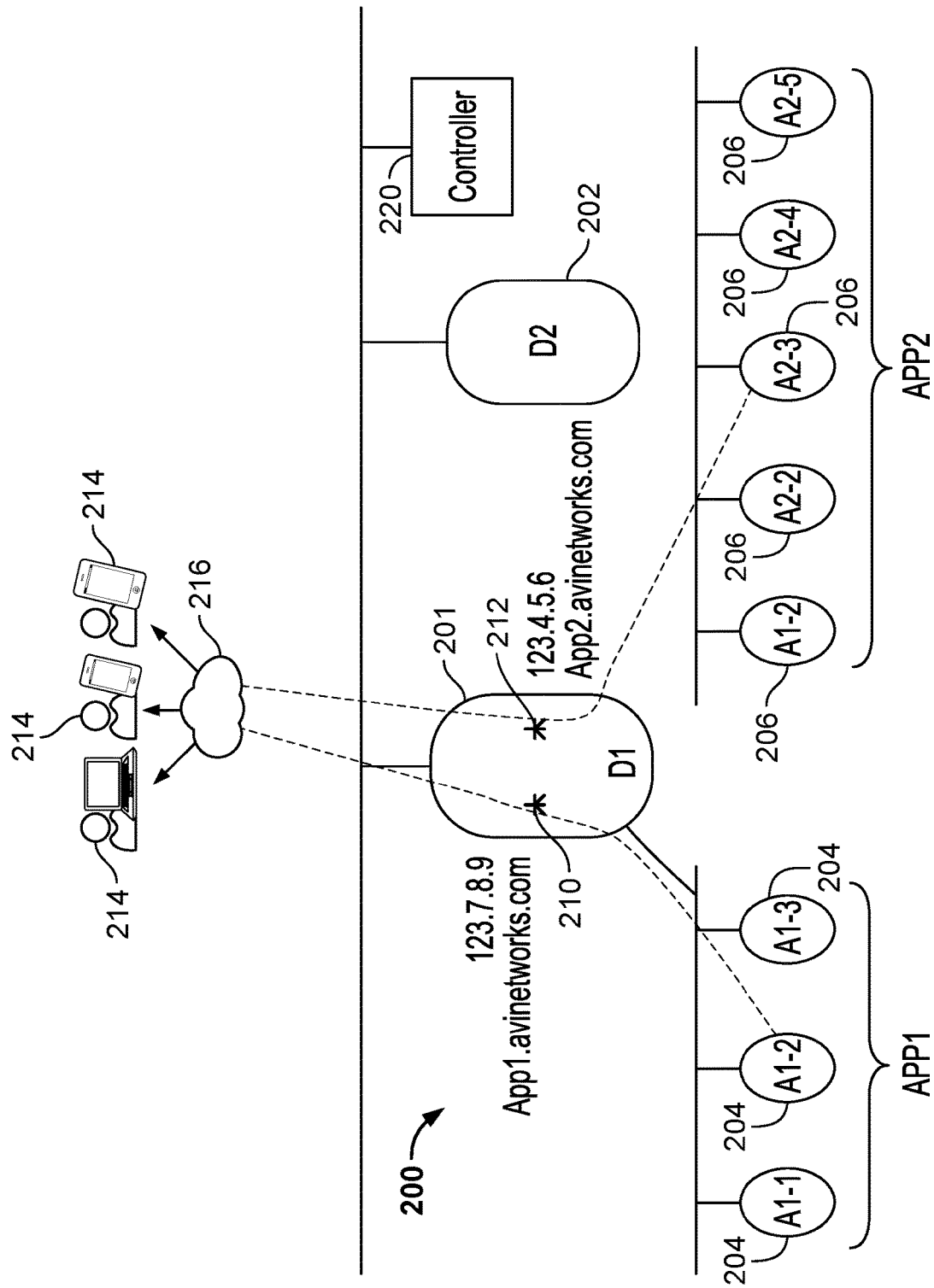
FIG. 2 is a block diagram illustrating an example of a distributed service platform in its initial state.

FIG. 2 is a block diagram illustrating an example of a distributed service platform in its initial state.

In this example, client devices 214 interact with network applications 204 and 206 which execute on devices on network 200. A client device can be a laptop computer, a desktop computer, a tablet, a mobile device, a smart phone, or any other appropriate computing device. In various embodiments, a web browser, a special purpose application, or other appropriate client application is installed at the client device, enabling a user to access network applications 204 and 206 via a network (e.g., the Internet). A network application (also referred to as a target application) is an application that is provided over a network. Examples of network applications include web applications, shopping cart applications, user authentication, credit card authentication, email, file sharing, virtual desktops, voice/video streaming, online collaboration, etc. The network applications may execute on application servers Network 200 can be a data center network, an enterprise network, or any other appropriate network. On network 200, device 201 (also referred to as D1 or the original device) is configured to provide a first network service 210 to a first set of network applications 204 ("App1"), and a second network service 212 to a second set of network applications 206 ("App2"). As used herein, a device refers to an entity with one or more network interfaces through which networking traffic (e.g., packets) is sent and received. A device can be implemented using hardware, software, or a combination thereof. A device can be a physical device (e.g., a physical server computer), a virtual device (e.g., a virtual machine such as VMWare™), or a combination thereof. A network interface can be implemented as a physical port (e.g., an Ethernet port, a wireless interface, etc.), a virtual port (e.g., software emulation of a physical port), or a combination thereof. A network service processes traffic between one or more clients and one or more network applications, providing services on behalf of the applications. Examples of network services include load balancing, authorization, security, content acceleration, analytics, application management, etc. Each network service can be implemented as a set of software code (e.g., a software process or a part of a process) that executes on hardware. In this example, the first network service 210 is a load balancing service that balances processing loads among applications 204, and the second network service 212 is a firewall service that filters traffic sent to applications 206.

In this example, each network service provides service to its corresponding network applications under a unique Fully Qualified Domain Name (FQDN), which is translated into a unique Internet Protocol (IP) address (also referred to as a virtual IP address). In this example, network applications 204 and network applications 206 are configured to be accessible to clients 214 at corresponding domain names. Each domain name corresponds to a unique IP address that is resolved by a DNS server. Specifically, the DNS server stores the mappings of FQDNs to IP addresses, and can be used to look up the virtual IP address of the network service that corresponds to a particular FQDN. In this example, applications 204 are accessible at the URL of "App1.avinetworks.com," which corresponds to the IP address of 123.7.8.9. Applications 206 are accessible at the URL of "App2.avinetworks.com," which corresponds to the IP address of 123.4.5.6.

Instances of network applications 204 and 206 can operate on device 201 and/or one or more other devices. The configuration is flexible and can be different in various embodiments. In this example, traffic (e.g., packets associated with traffic flows) from client devices 214 is sent to device 201 and processed by network service 210 or 212. For example, traffic designated for applications 204 (e.g., requests for the URL of "App1.avinetworks.com" sent by the clients) is load balanced by service 210 and each flow is sent to a selected one of applications 204 to be further processed. Traffic designated for applications 206 (e.g., requests for the URL of "App2.avinetworks.com" sent by the clients) is filtered by firewall service 212 and sent to an application 206 to be further processed.

An upstream network device 216 is configured to forward traffic from client devices 214 destined for the network applications to network devices such as D1 and/or D2. Examples of an upstream network device include a router, a switch, a bridge, etc. While the same upstream network devices can also be configured to forward packets from network 200 to client devices 214, for purposes of discussion, network 200 is referred to as the end of the network traffic stream from the client, and points on the network path before the packet reaches network 200 are said to be upstream from the network.

In this example, the upstream network device maintains configuration information that includes routing information (e.g., a routing table) specifying the routes for certain network destinations. The configuration information further includes the mapping of IP addresses to hardware identification information (e.g., an ARP table). Prior to the migration, upstream network device 216 maintains an ARP table that maps the IP address of 123.4.5.6 and 123.7.8.9 to one or more MAC addresses on D1.

Later, it is determined that D1 does not have sufficient resources to provide both network services 210 and 212, therefore network service 212 needs to be migrated to another device 202 (also referred to as D2 or the replacement device). During migration, state information associated with existing flows are copied or moved from D1 to D2, and the flows themselves are uninterrupted. The determination that a migration should take place can be made by D1 itself or by a controller 220. For example, a monitoring application on D1 or the controller may determine that the number of flows handled by network service 212 has been exceeded. According to preconfigured policies, D1 or the controller will initiate the migration process. The migration process is described in greater detail below.

Figure 3:
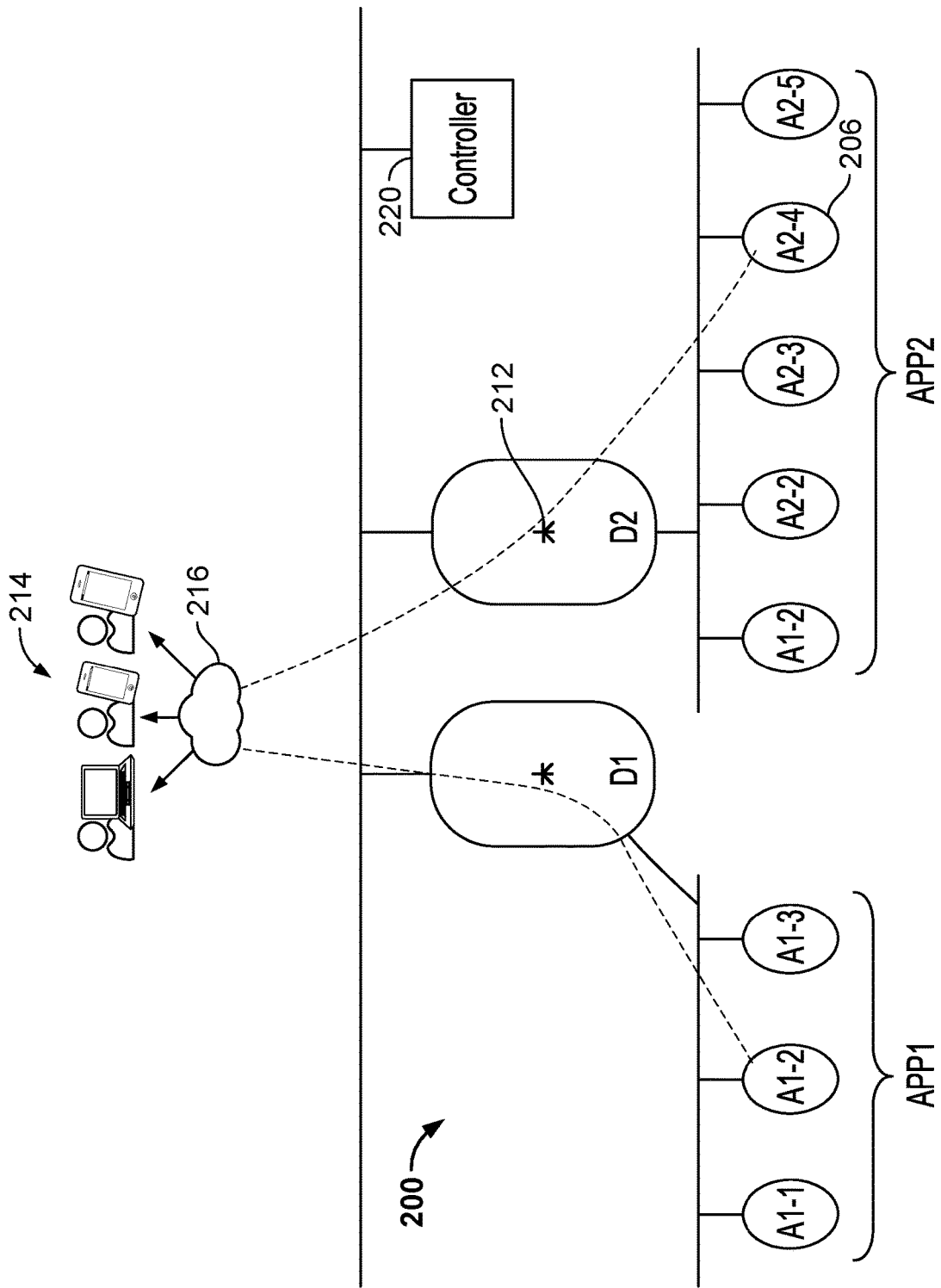
FIG. 3 is a block diagram illustrating an example of the distributed service platform in its migrated state.

FIG. 3 is a block diagram illustrating an example of the distributed service platform in its migrated state. In this example, the migration process has been successfully completed. Network service 212 on D1 has been migrated to D2, which executes another instance of the same network service, also labeled as network service 212. New flows from clients 214 are serviced by network service 212 operating on D2, and then sent to an application 206. Existing flows that used to be serviced by network service 212 on D1 have also been migrated, and are now serviced by network service 212 on D2. As will be discussed in greater detail below, the existing flows are uninterrupted, making the migration process transparent to the existing flows.

In some embodiments, a controller initiates the migration process. The controller can be implemented as a software application, a hardware device or component, or a combination. The controller is configured to control the operations of the network services and/or the network devices. In some embodiments, the controller also monitors the health and performance of the network services and/or the network devices. The controller can be a stand-alone device, or be integrated with another device such as D1.

Figure 4:
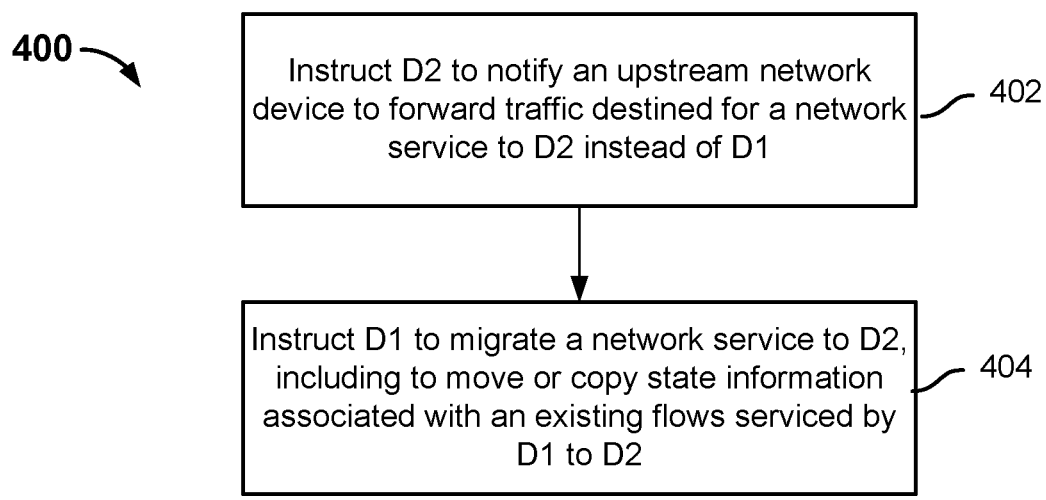
FIG. 4 is a flowchart illustrating an embodiment of a migration process.

FIG. 4 is a flowchart illustrating an embodiment of a migration process. Process 400 can be performed by a controller such as 220 of FIG. 2. In some embodiments, process 400 is invoked when the controller, based on its observation of the performance of network services on D1, determines that D1 has run out of resources (e.g., connections, memory, etc.) and cannot adequately provide the network services. In some embodiments, process 400 is invoked when the controller receives diagnostic or other data sent by D1 indicating that the one can no longer adequately provide existing network services.

Referring to FIG. 2, an upstream network device (e.g., router 216) is configured to forward packets from clients 214 to network devices such as D1 and/or D2. Initially, according to routing and ARP information, the upstream network device is configured to forward traffic destined for the IP address associated with service 212 to D1.

At 402, D2 is instructed to notify an upstream network device to forward traffic that is to be serviced by the network service to be migrated (in this case, network service 212) to D2 to instead of D1. Some examples of how to accomplish this are described more fully below.

In some embodiments, the upstream network device maintains an ARP table that maps IP addresses to hardware addresses (e.g., network interface addresses). The upstream network device uses the ARP table to determine, for each packet that is destined for a certain IP address, the corresponding device/network interface to which the packet should be forwarded. To perform 402, D2 is instructed to notify the upstream network device by sending a gratuitous Address Resolution Protocol (ARP) that associates a network interface identifier of D2 (e.g., D2's MAC address) with the network service's virtual IP address. Upon receiving the notification, the upstream network device updates its ARP table, changing the IP address from being mapped to the MAC address of D1 to being mapped to the MAC address of D2. Thereafter, the upstream network device forwards packets designated for the IP address to D2. The format of the gratuitous ARP message is specified by existing ARP protocol, and the mechanism for sending the message is known to those skilled in the art. Depending on implementation, the gratuitous ARP can be sent as soon as D2 is instructed to notify the upstream network device, or at a later time after existing flows are migrated.

At 404, D1 is instructed to migrate the network service to D2. Migration of the network service includes copying or moving state information associated with one or more existing flows currently serviced by D1 to D2. In various embodiments, an indication of the instruction to migrate is sent in a packet, a message, an inter-process communication (IPC) call, or any other appropriate format. D1 can copy or move the state information according to a preconfigured message or other data format.

Typically, a flow is established when a connection request is made by one device at one point, and is ended when the connection is closed by either devices at either points or due to inactivity/timeout. State information associated with existing flows serviced by D1 is maintained in a flow table using known techniques. In some embodiments, the state information includes identification information of the flow, and information about the status and/or processing of the flow. In various embodiments, what is included in the state information depends on the connection and/or the requirements of the network service. For example, the state information can include sequence information used to reconstruct the TCP state, information about the load balanced server selected by the load balancing network service to handle the flow, whether a flow is permitted according to the firewall network service, security/encryption state of a flow according to a security network service, etc.

To migrate an existing flow, state information associated with the existing flow is moved or copied from D1 to D2, ensuring that D2 has the relevant information to process incoming packets associated with existing flow in the same way D1 would, so that the existing flow is uninterrupted. Specifically, the TCP connection for the flow is not broken; the flow states are maintained with respect to the client; and the client's interactions with its corresponding network application remain the same as before the migration. For example, if the state information recorded by load balancing service 212 on D1 indicates that an existing flow is sent to a specific server running a specific instance of network application 206, then the migration process copies the state information to D2 to ensure that packets associated with this flow are still sent to the same server/network application instance and that the flow is uninterrupted. In some embodiments, the migration of state information is conducted using a proprietary protocol implemented based on inter-process communication (IPC) methods, where a function call is invoked by the first device to send, to the second device, state information associated with the one or more existing flows being migrated.

As will be described in greater detail below, depending on implementation, 402 and 404 can be performed in different order, including in parallel.

Figure 5:
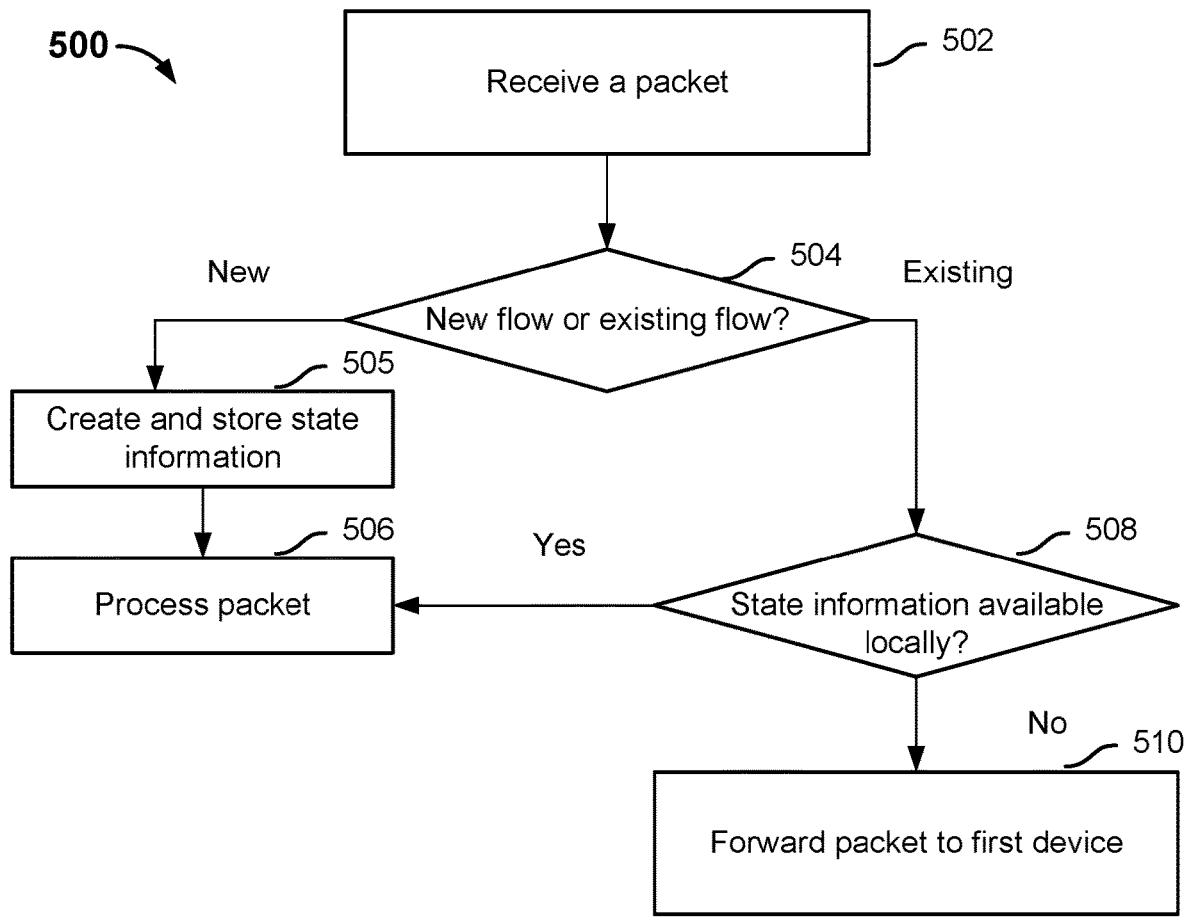
FIG. 5 is a flowchart illustrating an embodiment of a process for handling a packet that is forwarded by the upstream network device to D2.

In some embodiments, D2 sends the gratuitous ARP as soon as possible. For example, the controller can send an indication (e.g., a predefined message) indicating that the network service is to be migrated from D1 to D2, where the indication includes the virtual IP address of the network service to be migrated. In response, D2 sends the gratuitous ARP. Thus future packets designated for the IP address (including new flows and for existing flows) are immediately forwarded by the upstream network device to D2 instead of D1. In such embodiments, D1 will not receive further flows designated for the IP address once the upstream network device's ARP table is updated based on the gratuitous ARP sent by D2. FIG. 5 is a flowchart illustrating an embodiment of a process for handling a packet that is forwarded by the upstream network device to D2. In this example, process 500 is performed by D2, which is configured to send the gratuitous ARP as soon as possible. In other words, prior to process 500, D2 has received an indication that migration has begun, and sent the gratuitous ARP to the upstream network device.

At 502, a packet is received at D2.

At 504, it is determined whether the packet is associated with a new flow or an existing flow. In a TCP flow, the determination is made by checking a SYN flag in the packet. The SYN flag is set if the packet is associated with a new flow (i.e., it is the first packet in a flow), and is not set if the packet is associated with an existing flow.

If the packet is associated with a new flow, at 505, state information is created for the new flow and stored. For example, the source and destination addresses and port number are determined based on the header of the packet. Any other appropriate state information can also be determined based on the packet. The state information is stored in a table or other appropriate data structure.

At 506, the packet is processed by D2. In other words, the network service is applied on the packet by D2, using the state information as appropriate, and the resulting packet is forwarded to the appropriate applications.

Packets can be received on an existing flow while the migration of state information from D1 to D2 is still in process. A packet associated with an existing flow should be handled by the device that has the state information associated with the existing flow. Thus, if the packet is associated with an existing flow, at 508, it is determined whether state information associated with the flow is available locally (i.e., whether the state information is available to D2). In some embodiments, D2 maintains state information locally in a table that is indexed according to a combination of the source address, the destination address, and the port of the flow. Other formats and data structures (e.g., a tree, a list, etc.) are possible. To determine whether state information associated with the flow is available locally, the source address, destination address, and port of the packet are used to construct an index to conduct a lookup in the table. If an entry is found, it means that D2 has state information associated with the existing flow, and therefore is capable of handling traffic associated with the flow. Control is therefore transferred to 506, where the packet is processed.

If, however, no state information is available locally, it indicates that the state information for this flow has not yet migrated from D1 to D2. D2 is therefore not yet capable of handling traffic associated with the flow. Accordingly, at 510, the packet is forwarded to D1 to be processed. Specifically, D2 will rewrite the destination MAC address of the packet to be the MAC address associated with D1 and send the packet to D1 via either the network interface on which the packet is received or another appropriate network interface.

D1 continues to send state information associated with existing flows until state information associated with all existing flows that need to be migrated are copied to D2. In some embodiments, D1 notifies D2 when the former has completely migrated its flow state information to the latter, so that D2 will discontinue process 500 but instead process all packets received.

Figure 6:
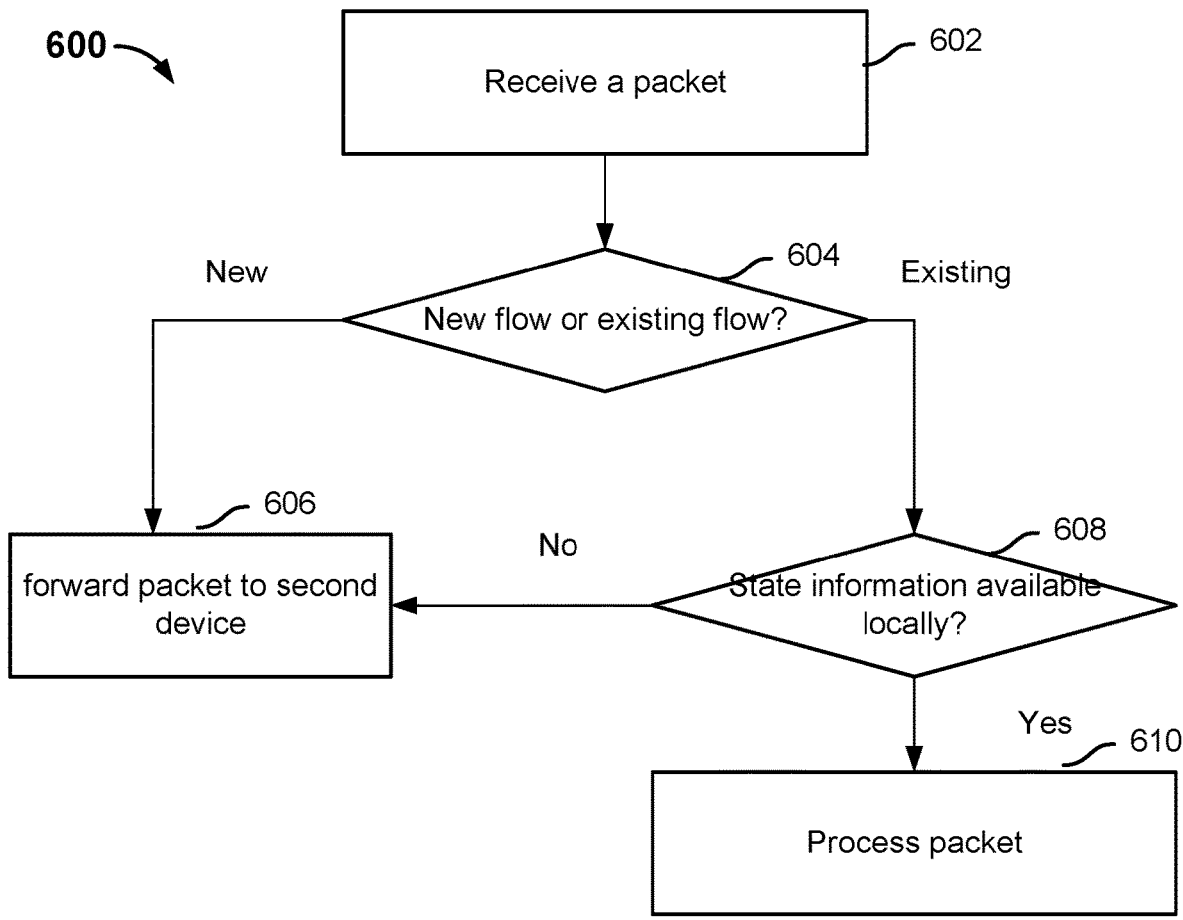
FIG. 6 is a flowchart illustrating an embodiment of a process for handling a packet that is forwarded by the upstream network device to D1 in an embodiment where D2 is configured to send the gratuitous ARP after the state information is completely migrated.

In some embodiments, D2 waits to send the gratuitous ARP after state information associated with the flows is completely migrated from D1 to D2. Accordingly, future packets designated for the IP address are still forwarded by the upstream network device to D1 until the ARP is sent and the upstream network device's ARP table is updated. FIG. 6 is a flowchart illustrating an embodiment of a process for handling a packet that is forwarded by the upstream network device to D1 in an embodiment where D2 is configured to send the gratuitous ARP after the state information is completely migrated.

Process 600 is performed by D1. At 602, a packet is received. At 604, it is determined if the packet is associated with a new flow or an existing flow. In some embodiments, the SYN flag of the packet is examined to determine whether the packet is associated with a new flow. If the packet is a first packet in a new flow with the SYN flag set, it should be processed by D2 since D2 is supposed to be eventually in charge of handling all flows destined for the IP address. Accordingly, at 606, the packet is forwarded to D2. Specifically, the destination MAC address of the packet is rewritten to be the MAC address of D2, and the rewritten packet is forwarded to D2. D2 will process the packet and add an entry to its state table. If the packet is associated with an existing flow, at 608, whether state information is available locally (i.e., whether the state information is available to D1) is checked. As discussed above, the check can be performed by looking up in a state table maintained by D1 using index information such as the source and destination addresses and the port number of the packet. If the state information is found to be available locally, then D1 processes the packet at 610. If, however, the state information is no longer available locally, it indicates that the state information associated with this flow has already been migrated to D2. Thus, at 606, the packet is forwarded to D2.

A specific example of migration is given in connection with FIG. 2 and FIGS. 7-9. In the example, messages are sent between components of a network such as 200 of FIGS. 2 and 3. The arrows indicate the directions of the messages.

Figure 7:
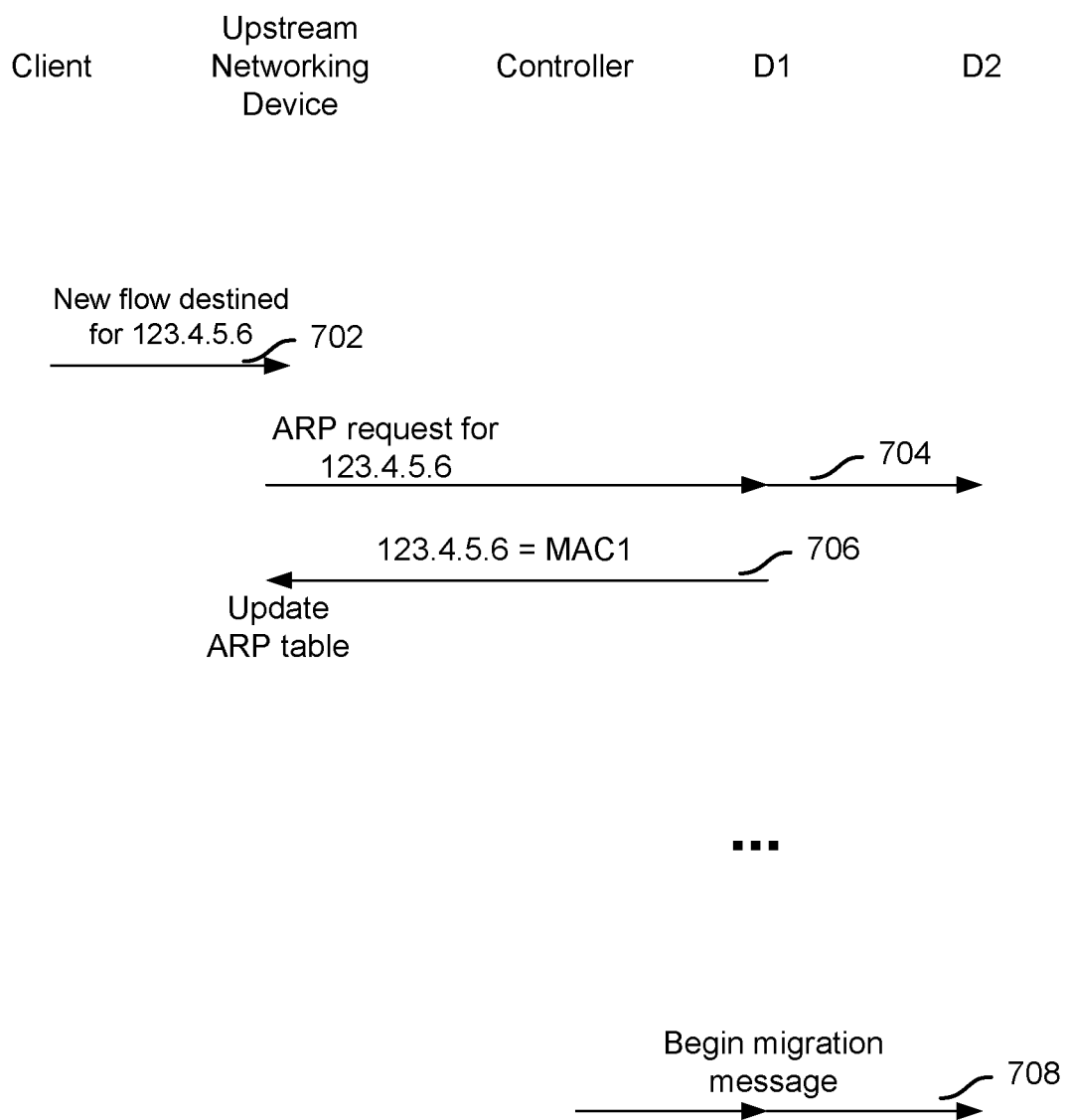
FIG. 7 is a messaging diagram illustrating an example set of data that is sent between different components before the network devices undergo the migration process.

FIG. 7 is a messaging diagram illustrating an example set of data that is sent between different components before the network devices undergo the migration process. Initially, as indicated by arrow 702, the client sends a packet for a new flow that is destined for the IP address of 123.4.5.6 according to the result of a DNS resolution operation. The packet is received by the upstream networking device, which processes the packet and sends an ARP request for the address of 123.4.5.6. The ARP request is broadcasted to network devices on the network, such as D1 and D2, as shown by arrows 704. At this point, only D1 is configured to service packets destined for the address of 123.4.5.6. Accordingly, as shown by arrow 706, D1 responds to the ARP request by sending to the upstream networking device an ARP reply that maps the address of 123.4.5.6 to D1's network interface address, MAC1. In the ARP table of the upstream networking device, an entry that maps 123.4.5.6 to MAC1 is created. Additional data exchange may take place until such time when it is determined that service 212 should be migrated from D1 to D2. A "begin migration" message is sent by the controller to D1 and D2, as shown by arrows 708. In some embodiments, a protocol is pre-defined for communications between the controller and the network devices, implemented using mechanisms such as inter-process communication (IPC). The "begin migration" message is formatted according to the protocol, and indicates to D1 and D2 that service 212 is to be migrated from D1 to D2.

Figure 8:
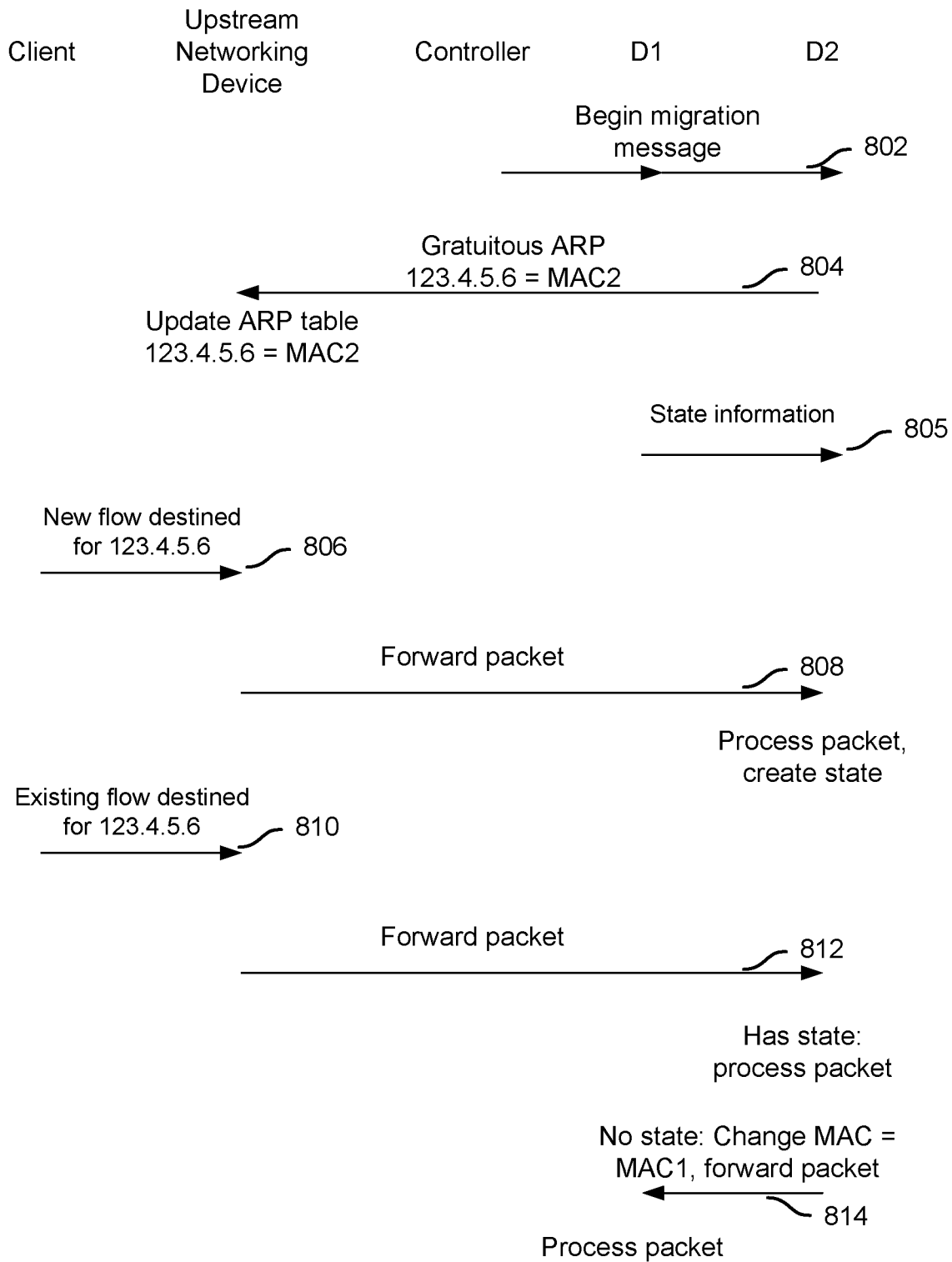
FIG. 8 is a messaging diagram illustrating an example set of data that is sent between different components during the migration process.

FIG. 8 is a messaging diagram illustrating an example set of data that is sent between different components during the migration process. In this example, the "begin migration" message is sent by the controller (arrow 802) to D1 and D2. D2 immediately launches another instance of network service 212, and sends a gratuitous ARP message mapping the IP address of 123.4.5.6 to D2's own network interface address, MAC2, as shown by arrow 804. Upon receiving the gratuitous ARP, the upstream networking device will update its ARP table, changing the mapping of 123.4.5.6 to MAC2.

Meanwhile, state information for existing flows is sent from D1 to D2, as shown by arrow 805. The state information can be transferred one entry at a time or in a batch with multiple entries.

While the state information is being migrated from D1 to D2, the clients continue to send traffic. A packet associated with a new flow destined for 123.4.5.6 is sent by a client to the upstream networking device, as shown by arrow 806. The upstream networking device looks up in its ARP table the MAC address associated with 123.4.5.6, and forwards the packets to D2, as shown by arrow 808. Network service 212 on D2 processes the packet and creates a new state entry in D2's state table.

A packet associated with an existing flow destined for 123.4.5.6 is sent by a client to the upstream networking device, as shown by arrow 810. Again, the upstream networking device looks up in its ARP table the MAC address associated with 123.4.5.6, and forwards the packets to D2, as shown by arrow 812. If D2 has state information associated with the flow, it will process the packet; otherwise, D2 will change the MAC address of the packet from MAC2 to MAC1, and forwards the packet to D1, as shown by arrow 814. Since it currently maintains the state information associated with the flow, D1 will process the packet.

Figure 9:
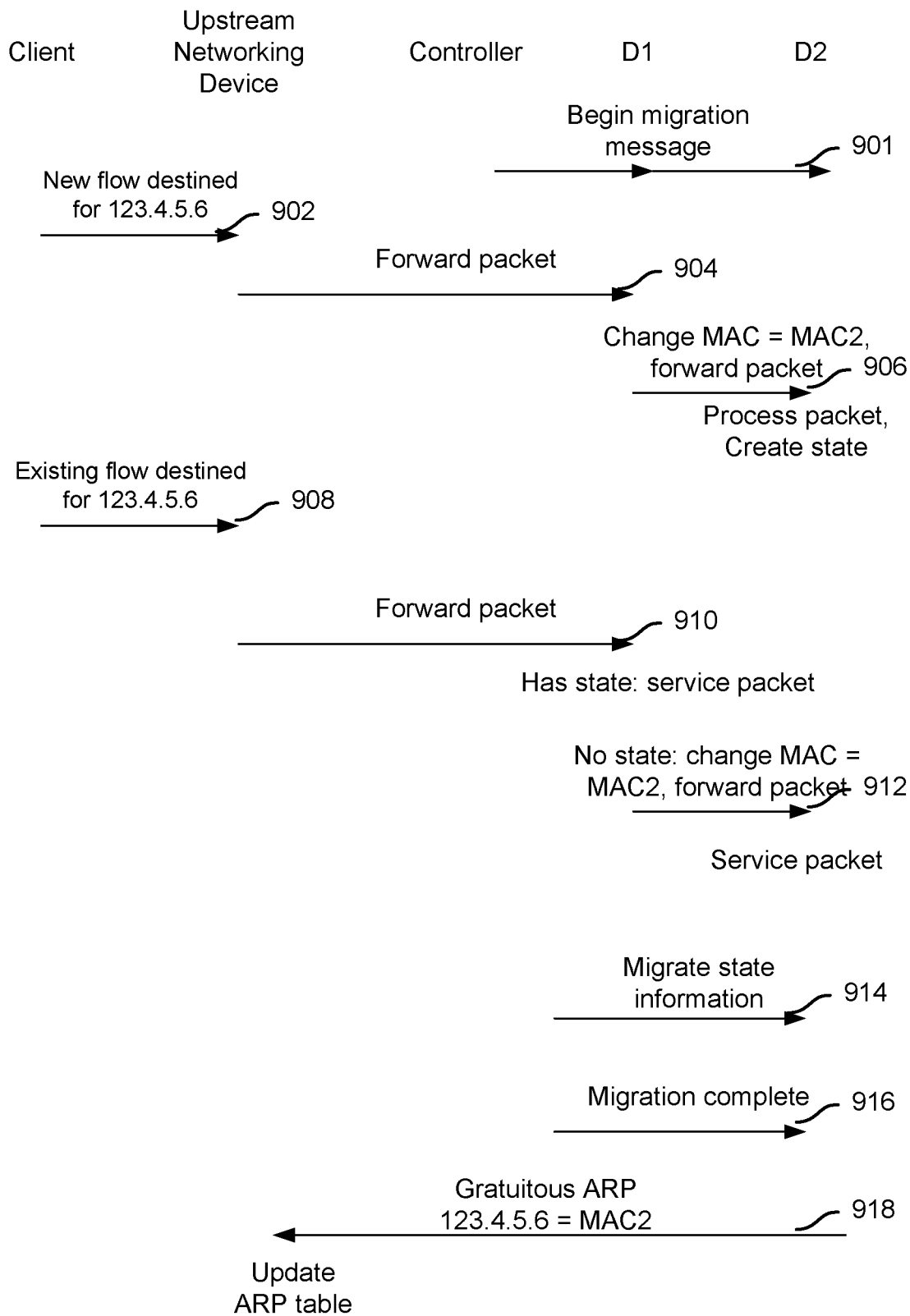
FIG. 9 is a messaging diagram illustrating another example set of data that is sent between different components during the migration process.

FIG. 9 is a messaging diagram illustrating another example set of data that is sent between different components during the migration process. In this example, the "begin migration" message is sent by the controller (arrow 901) to D1 and D2. Upon receiving the message, D2 launches another instance of network service 212, but does not immediately send the gratuitous ARP to the upstream networking device.

When a packet associated with a new flow destined for 123.4.5.6 is sent by a client to the upstream networking device (arrow 902), the upstream networking device will continue to forward the packet to D1 since nothing in its ARP table has changed (arrow 904). D1, however, having been notified that the migration is in process, will change the network interface address of the packet from MAC1 to MAC2, and forwards the packet to D2 (arrow 906). D2 will process the packet and create a new state entry in its state table.

Similarly, when a packet associated with an existing flow destined for 123.4.5.6 is sent by a client to the upstream networking device (arrow 908), the upstream networking device will continue to forward the packet to D1 since nothing in its ARP table has changed (arrow 910). D1 will check whether the state information associated with the flow is available. If so, D1 will service the packet. If no state information associated with the flow is available, the state information has already been migrated to D2. Thus D1 will change the MAC address of the packet to MAC2, and forward the packet to D2 (arrow 912).

As discussed above, when D2 forwards the received packet to D1 (e.g., 510 of process 500) or when D1 forwards the received packet to D2 (e.g., 606 of process 600), the MAC address needs to be rewritten (e.g., MAC2 needs to be changed to MAC1 or vice versa). In some embodiments, each device implements a bottom layer referred to as a flow dispatch layer in its networking stack. The flow dispatch layer processes a packet that is received on the device's network interface and before the packet enters the TCP/IP stack. The flow dispatch layer performs the rewriting of the MAC address and forwarding of the packet. Since the rewriting and forwarding are performed by the flow dispatch layer before the packet enter into the TCP/IP stack, the amount of work that needs to be performed by each device in association with the forwarding action is reduced.

As discussed above, during the migration of the network service, D1 continues to handle existing flows to avoid disruption. These flows need to be moved to the new device in a reasonable amount of time. Some of these flows naturally complete; however, some flows stay for a long period of time.

Each flow has a state associated with it that is stored on D1. In some embodiments, depending on the type of service that is applied to the flow, D1 handles differently how the flow state is migrated from D1 to D2.

Figure 10:
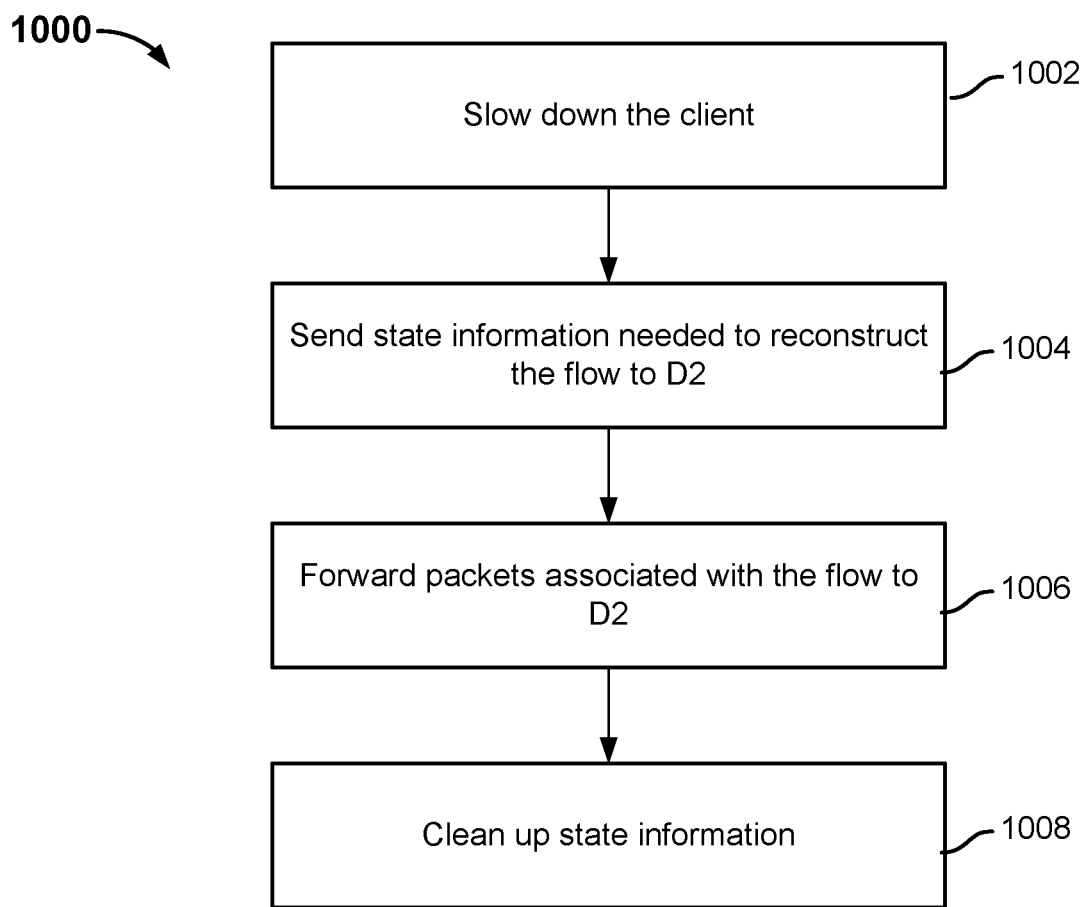
FIG. 10 is a flowchart illustrating an embodiment of a process for migrating state information associated with a TCP flow from D1 to D2.

FIG. 10 is a flowchart illustrating an embodiment of a process for migrating state information associated with a TCP flow from D1 to D2. Process 1000 is performed by D1 where D1 is not configured to terminate the TCP connection from the client, but merely doing cut-through forwarding of the data to the application servers. For example, D1 can be configured to implement Network Address Translation (NAT) of the TCP connection using a technique known as TCPFast).

At 1002, D1 slows down the client from sending data in the flow by stopping or slowing the opening the TCP window associated with the flow. In this example, D1 decreases the size of the TCP window available to receive data each time a packet is received from the client, indicating to the client that D1 can no longer accept data at the same rate and the client must slow down its transmission.

At 1004, state information needed to reconstruct the flow is sent to D2. In some embodiments, the state information includes information needed to reconstruct the TCP state for the TCP flow, such as sequence number, etc. The state information is sent to D2 in a control message.

At 1006, packets for this flow are forwarded to D2. In some embodiments, the packets are forwarded using D1's dispatch layer. D2 has by now constructed the TCP state for this flow and can handle this TCP flow. D2 also opens the TCP window to its normal levels.

At 1008, state information (e.g., TCP or proxy state) for the existing flow is cleaned up (e.g., deleted).

Figure 11:
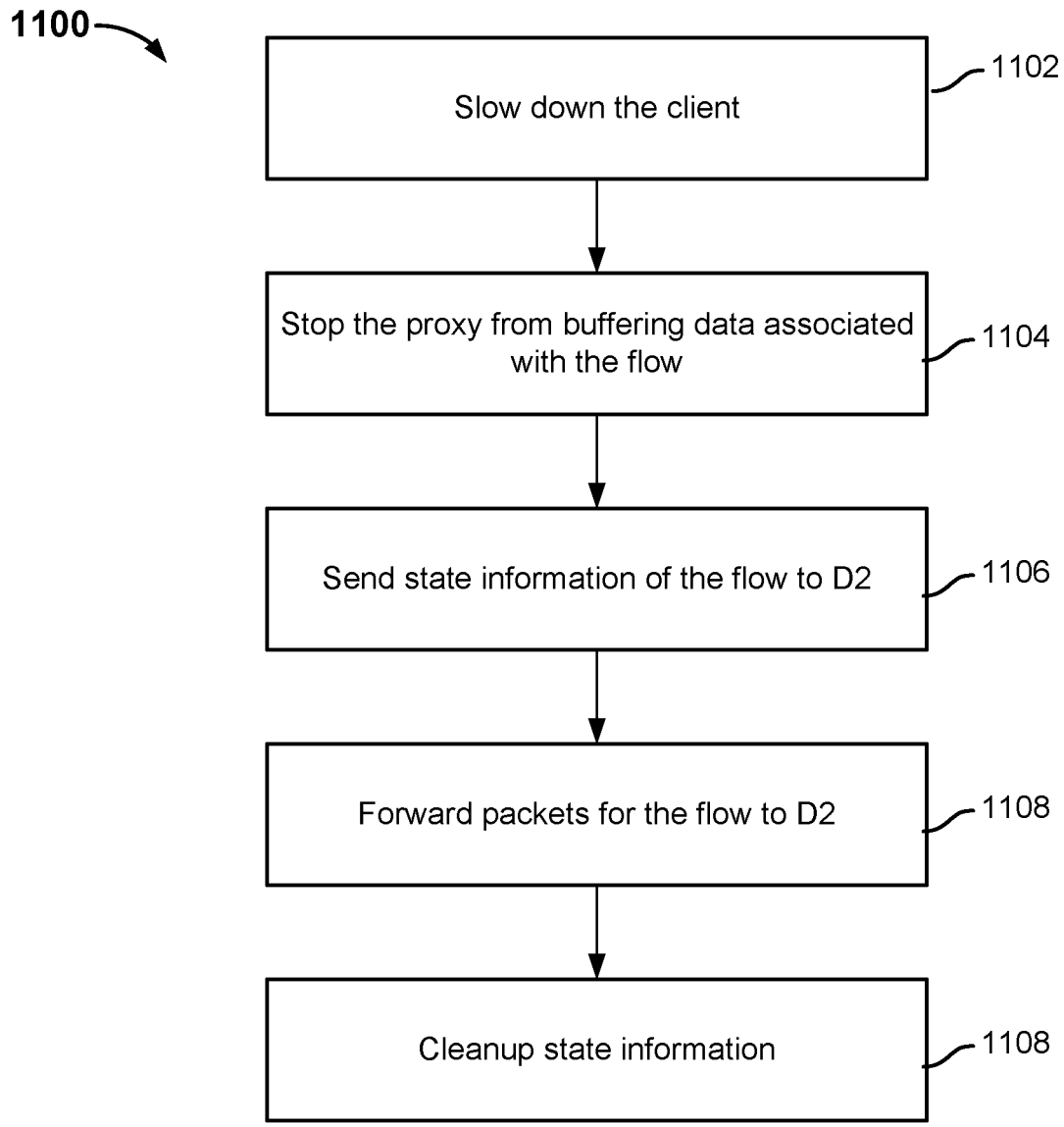
FIG. 11 is a flowchart illustrating another embodiment of a process for migrating state information associated with a TCP flow from D1 to D2.

FIG. 11 is a flowchart illustrating another embodiment of a process for migrating state information associated with a TCP flow from D1 to D2. Process 1100 is performed by D1 where D1 is configured to terminate the TCP connection from the client and to open a new TCP connection to the application server (in other words, D1 is acting as a full TCP proxy).

At 1102, D1 stops opening the TCP window to slow down the client. D1 decreases the size of the TCP window as data is received from the client, indicating to the client that D1's buffer is getting full and the client must slow down its transmission.

At 1104, D1 switches to a mode where in its role as the proxy, D1 is not buffering any data. In effect this switches the flow to being in a TCPFast mode. This step is preferably done at a transaction boundary so that the connection to the application server is no longer needed until the next transaction from the client.

At 1106, D1 sends the state information needed to reconstruct the flow to D2. In some embodiments, the state information includes information needed to reconstruct the TCP state for the TCP flow, such as sequence number, etc. The state information is sent in a control message.

At 1108, D1 starts forwarding packets for this flow to D2. In some embodiments, the forwarding is performed at D1's dispatcher layer.

To handle the flow, D2 opens a TCP window, switches to a full proxy mode, and performs the network service (e.g., making a new load balancing decision) for the flow from the client.

At 1110, D1 cleans up (e.g., deletes) any TCP/proxy state for this flow.

Since migration of state information can take place while data is received by the devices, process 1000 may execute while process 500 or 600 is executing. Similarly, process 1100 may execute white processes 500 or 600 is executing.

Migration of a network service between devices has been described. The technique allows the migration to take place in a transparent manner, without interrupting the traffic flow between the client device and a network application accessed by the client device.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method performed by a controller to migrate a network service at a first device to a second device without interrupting traffic flows for which the network service is being performed, the network service associated with a particular Internet Protocol (IP) address, the method comprising:

instructing the first device to migrate the network service to the second device, wherein the migration includes sending, to the second device, state information associated with at least one existing flow currently serviced by the network service at the first device; and instructing the second device to send a gratuitous address resolution protocol (GARP) message to an upstream network device to associate the particular IP address with a particular network interface of the second device at the upstream network device such that future traffic destined for the particular IP address received at the upstream network device is directed to the particular network interface of the second device, wherein, after the GARP message is sent by the second device but before the state information for a particular existing flow is sent to the second device, the second device (i) receives a packet belonging to the particular existing flow and (ii) forwards the packet to the first device for processing.

2. The method of claim 1, wherein prior to the gratuitous ARP being sent, traffic that is associated with a new flow is received by the first device and forwarded by the first device to the second device.

3. The method of claim 1, wherein the first device and the second device include at least one of a physical device and a virtual device.

4. The method of claim 1, wherein, after state information for the particular existing flow has been sent to the second device, but before the GARP message is sent;
the first device receives a packet of the particular existing flow; and
the first device forwards the packet to the second device for processing.

5. The method of claim 1, wherein, before state information for the particular existing flow has been sent to the second device, and before the GARP message is sent;
the first device receives a packet of the particular existing flow; and
the first device performs the network service.

6. A controller system comprising:
one or more processors;
one or more networking interfaces configured to transmit and receive data; and
a non-transitory machine readable medium storing a program for execution by the processing units, the program for migrating a network service at a first device to a second device without interrupting traffic flows for which the network service is being performed, the network service associated with a particular Internet Protocol (IP) address, the program comprising sets of instructions for:
instructing the first device to migrate the network service to the second device, wherein the migration includes sending, to the second device, state information associated with at least one existing flow currently serviced by the network service at the first device; and instructing the second device to send a gratuitous address resolution protocol (GARP) message to an upstream network device to associate the particular IP address with a particular network interface of the second device at the upstream network device such that future traffic destined for the particular IP address received at the upstream network device is directed to the particular network interface of the second device, wherein, after the GARP message is sent by the second device but before the state information for a particular existing flow is sent to the second device, the second device (i) receives a packet belonging to the particular existing flow and (ii) forwards the packet to the first device for processing.

7. The controller system of claim 6, wherein prior to the gratuitous ARP being sent, traffic that is associated with a new flow is received by the first device and forwarded by the first device to the second device.

8. The controller system of claim 6, wherein the first device and the second device include at least one of a physical device and a virtual device.

9. The controller system of claim 7, wherein, after state information for the particular existing flow has been sent to the second device, but before the GARP message is sent;
the first device receives a packet of the particular existing flow; and
the first device forwards the packet to the second device for processing.

10. The controller system of claim 6, wherein, before state information for a particular existing flow has been sent to the second device, and before the GARP message is sent;
the first device receives a packet of the particular existing flow; and
the first device performs the network service.

11. A non-transitory machine readable medium storing a program for execution by a set of processing units, the program for migrating a network service at a first device to a second device without interrupting traffic flows for which the network service is being performed, the network service associated with a particular Internet Protocol (IP) address, the program comprising sets of instructions for:
instructing the first device to migrate the network service to the second device, wherein the migration includes sending, to the second device, state information associated with at least one existing flow currently serviced by the network service at the first device; and instructing the second device to send a gratuitous address resolution protocol (GARP) message to an upstream network device to associate the particular IP address with a particular network interface of the second device at the upstream network device such that future traffic destined for the particular IP address received at the upstream network device is directed to the particular network interface of the second device, wherein, after the GARP message is sent by the second device but before the state information for a particular existing flow is sent to the second device, the second device (i) receives a packet belonging to the particular existing flow and (ii) forwards the packet to the first device for processing.

12. The non-transitory machine readable medium of claim 11, wherein prior to the gratuitous ARP being sent, traffic that is associated with a new flow is received by the first device and forwarded by the first device to the second device.

13. The non-transitory machine readable medium of claim 11, wherein the first device and the second device include at least one of a physical device and a virtual device.

14. The non-transitory machine readable medium of claim 11, wherein, after state information for the particular existing flow has been sent to the second device, but before the GARP message is sent;
   the first device receives a packet of the particular existing flow, and
   the first device forwards the packet to the second device for processing.

15. The non-transitory machine readable medium of claim 11, wherein, before state information for the particular existing flow has been sent to the second device, and before the GARP message is sent;
   the first device receives a packet of the particular existing flow; and
   the first device performs the network service.

\* \* \* \* \*